US008353749B2

(12) United States Patent
Sanders

(10) Patent No.: US 8,353,749 B2
(45) Date of Patent: Jan. 15, 2013

(54) VEHICLE TRACKING SYSTEM, METHOD AND GAME

(76) Inventor: Dean Sanders, Stockton, CA (US)

( * ) Notice: Subject to any disclaimer, the term of this patent is extended or adjusted under 35 U.S.C. 154(b) by 623 days.

(21) Appl. No.: 12/231,902

(22) Filed: Sep. 4, 2008

(65) Prior Publication Data

US 2010/0160013 A1    Jun. 24, 2010

Related U.S. Application Data

(60) Provisional application No. 60/967,461, filed on Sep. 4, 2007.

(51) Int. Cl.
*A63F 13/00* (2006.01)
(52) U.S. Cl. ............. 463/6; 463/42; 463/43; 463/58; 463/59; 273/246; 273/317.1; 273/359; 273/441; 434/62
(58) Field of Classification Search ............. 463/6–7, 463/20, 22–23, 30–34, 36–37, 42–43, 58–69; 273/246, 248–252, 258, 317.1, 359, 366–368, 273/441–446, 454–455, 460–461; 434/29, 434/61–71; 446/7; 472/86, 95, 130; 700/90–93; *A63F 13/00*
See application file for complete search history.

(56) References Cited

U.S. PATENT DOCUMENTS

| | | | |
|---|---|---|---|
| 5,731,788 A * | 3/1998 | Reeds ................. | 342/357.57 |
| 6,117,007 A * | 9/2000 | Matsuyama et al. ....... | 463/6 |
| 6,652,376 B1 * | 11/2003 | Yoshida et al. .......... | 463/6 |
| 7,601,055 B2 * | 10/2009 | Eika .................. | 463/6 |
| 7,736,220 B2 * | 6/2010 | Mori .................. | 463/6 |
| 7,744,451 B2 * | 6/2010 | Tipping et al. .......... | 463/6 |
| 7,855,638 B2 * | 12/2010 | Huston ............. | 340/539.13 |
| 7,883,403 B2 * | 2/2011 | Low et al. ............. | 463/16 |
| 2004/0135677 A1 * | 7/2004 | Asam ............... | 340/425.5 |
| 2004/0219978 A1 * | 11/2004 | Teramoto et al. ....... | 463/32 |
| 2004/0224740 A1 * | 11/2004 | Ball et al. .............. | 463/6 |
| 2006/0154713 A1 * | 7/2006 | Sunazuka et al. ........ | 463/6 |
| 2008/0039164 A1 * | 2/2008 | Shimada ............... | 463/6 |
| 2008/0186330 A1 * | 8/2008 | Pendleton et al. ....... | 345/619 |

* cited by examiner

*Primary Examiner* — Arthur O. Hall
(74) *Attorney, Agent, or Firm* — Matlock Law Group PC

(57) ABSTRACT

The "Vehicle Tracking System and Game" integrates a GPS navigation system with invention specific hardware and software. A user installs a mobile unit on his race vehicle which features software allowing a processor connected to the electronics of the user's vehicle to communicate with an inertial navigation system which collects racing information, with a remote database which features software for various interactive real-time or virtual GPS Racing Games and processing the racing information of all users, and with a GPS system in real time. The mobile unit collects, processes, saves and transmits user specific racing information continuously throughout the game. This racing information is data of racing performance parameters specific to the game subscribed for by the user. The database processes and evaluates the received racing information, offsets this information with the users' basic input data and compares the information of all users.

11 Claims, 17 Drawing Sheets

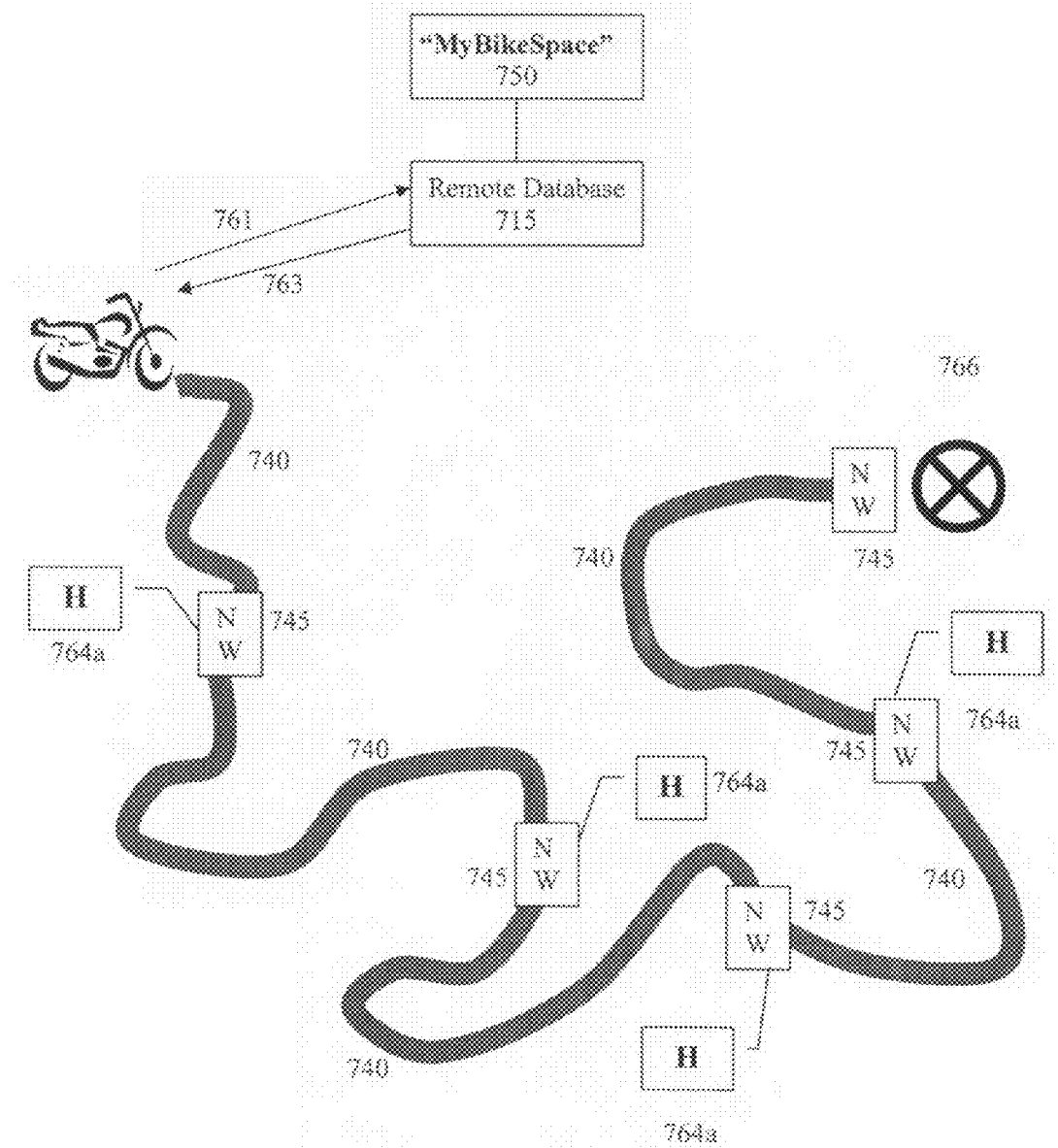

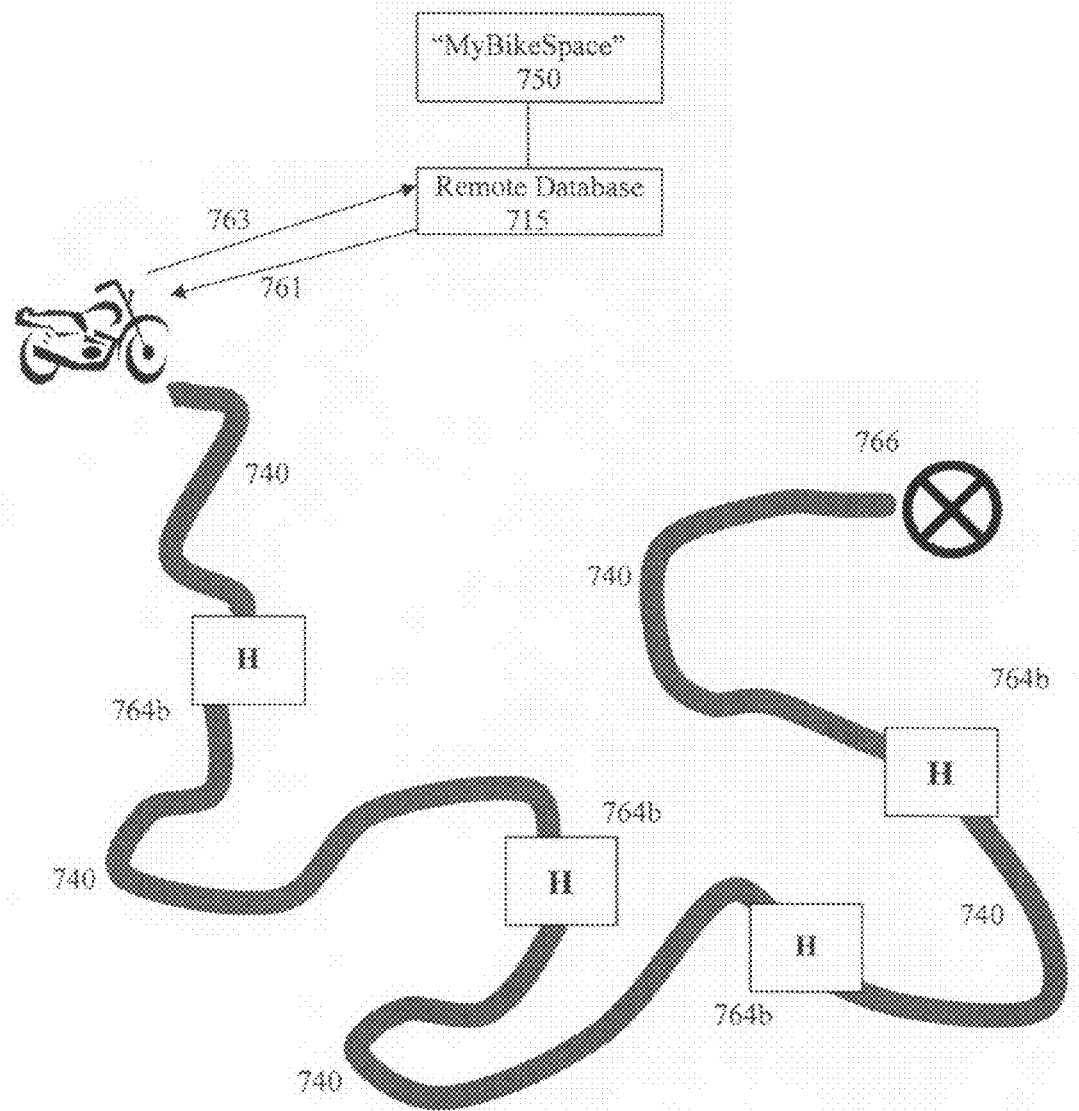

COURSE OUTPUT:

| | | |
|---|---|---|
| USER: | #101 | |
| MOTORCYCLE: | 2004 Yamaha TX650 | 1224 |
| IED NUMBER: | 54321 | 1270 |
| COURSE NUMBER: | 12345 | 1274 |
| | | 1243 |
| MBS COURSE RATING: | 725 (1000 max) | 1247 |
| RIDER RATING: | 423 (1000 max) | 1275 |
| MOTORCYCLE RATING: | 624 (1000 max) | 1272 |

1241

RECORDED DATA BASIC GPS RACE:

1230

| MILE | TIME | SPEED | ELEVATION CHANGE | LATERAL G FORCE | MAX POS. ACC | MAXI NEG. ACC |
|---|---|---|---|---|---|---|
| 28 | 1030.10 | 44.5 | | | | |
| 28.50000 | 1030.35 | 45.5 | -150 | | | |
| | 1030.60 | | -152 | 2.56 | 82.4 | 74.5 |
| | 1030.85 | | | | | |
| 28.54170 | 1031.10 | | | | | |
| | 1031.35 | | | | | |
| | 1031.60 | | | | | |
| | 1031.85 | | | | | |
| 28.57340 | 1032.10 | | | | | |

| 1231 | 1232 | 1233 | 1234 | 1235 | 1236 | 1237 |

FIGURE 12

VEHICLE TRACKING SYSTEM, METHOD AND GAME

CROSS-REFERENCES TO RELATED APPLICATIONS

This application claims the benefit of U.S. Provisional Application Ser. No. 60/967,461; filed on Sep. 4, 2007, the disclosure of which is incorporated herein by reference in its entirety.

BACKGROUND

The present invention relates generally to a vehicular tracking system, and, more particularly, to a system and method for tracking a vehicle performance while competing in the current GPS Racing Games using a Global Positioning System, an Inertial Navigation System and a transceiver for communicating location information to a centralized processor for the purpose of measuring and comparing vehicle performance.

The Global Positioning System (GPS) currently in service utilizes an artificial constellation of between 24 and 32 Medium Earth Orbit satellites which transmit precise microwave signals. These signals enable GPS receivers to reckon navigation data including location, speed, direction and time using a spread spectrum system. The reckoning is carried out on the Earth by receiving GPS signals from a plurality of satellites, for example, by receiving GPS signals from three satellites for two-dimensional positioning and from four satellites for three-dimensional positioning. In this way, based on the navigation data contained in the GPS signal from each satellite, position information on the receiving point such as a latitude, longitude and altitude thereof can be determined in near real time.

The GPS system was originally developed for U.S. military use, however, a part of the GPS signal has been made available for civil use. Therefore, it is possible to build navigation systems for vehicles using the GPS signal. In operation, a GPS receiver used for a vehicle-mounted navigation equipment starts a search operation to capture the signal from a GPS satellite when the system is first activated. A GPS receiver may also need to recapture the GPS satellite when the vehicle emerges from a tunnel for example, and the reception of the GPS signals from the GPS satellites is interrupted for more than a specified period of time (for example, one minute). The satellite signals, as mentioned above, are transmitted by the spread-spectrum system. To reckon a position the GPS must be initiated; a satellite signal must acquired and the spread spectrum signal "despread" to determine location information. This process induces a delay limiting the GPS's ability to provide real time position information. Because of this delay, the conventional GPS receiver is not capable of dealing with an interruption of the received signal, such as when the vehicle is in the tunnel. It takes a considerable time for the GPS receiver to recapture the GPS satellite after the vehicle passes through the tunnel thus causing a problem in positioning. Also the ability of a GPS to provide real-time position information is limited to about once per second by the frequency of the passing satellites, thus a short burst of acceleration may not be appropriately reckoned. Because of these limitations inertial navigation systems are used to provide more accurate location information.

Inertial navigation systems are well known in the art and are used to provide real-time position information. A typical inertial navigation system integrates the information gathered from a combination of gyroscopes and accelerometers to determine the current state of the system. Gyroscopes measure the angular velocity of the system in the inertial reference frame. By using the original orientation of the system in the inertial reference frame as the initial condition and integrating the angular velocity, the system's current orientation is known at all times. Accelerometers measure the linear acceleration of the system in the inertial reference frame, but in directions that can only be measured relative to the moving system. By tracking both the current angular velocity of the system and the current linear acceleration of the system acceleration of the system in the inertial reference frame. Performing integration on the inertial accelerations and velocities yields the inertial state of the system. All inertial navigation systems suffer from small errors in the measurement of acceleration and angular velocity which in turn are integrated into progressively larger errors over time. Often inertial navigation is used to complement GPS, providing a higher degree of accuracy. By properly combining the information from an inertial navigation system and the GPS, suitable vehicle position can be determined.

The best known use of the GPS system is as an automotive navigation system. This satellite navigation system designed for use in automobiles uses a GPS navigation device to acquire position data to locate the user on a road in the unit's map database. Using the road database, the unit can give directions to any other selected locations along roads also in its database. Dead reckoning using distance data from sensors attached to the drive-train, a gyroscope and an accelerometer can be used for increased reliability, as GPS signal loss and/or multipath can occur due to urban canyons, tunnels or other natural and artificial conditions interfering with the GPS signals.

In view of the foregoing, a combined GPS and inertial navigation system can allow for providing accurate location information on racing vehicles. Racing is known for its severe accidents resulting from frequently occurring collisions amongst the competitors and other difficulties caused by a physical interference of one competitor on another. Thus, it would be advantageous to have a means to race vehicles without requiring the vehicles vie for the same physical space at the same time. As such, what is needed is a means to collect, record and compare vehicle position information combined with objective vehicle and race driver data for the purposes of determining a performance in a vehicle competition.

The Vehicle Tracking System and Game enables various users to compete with each other by comparing their location histories, their performance and achieved results on different race tasks, and their user data. The competitors do not need to be physically present at the same time but a server collects the users' data transmitted from the users' vehicles mobile unit to a database and determines the winner based on a comparison of their race data. This enables various types of games based on time, speed, maximum acceleration, stopping distances, consistency, skillfulness, or other performance parameters and racer information. The GPS racing systems comprises an Inertial Navigation System, a GPS, and a remote database and webserver.

BRIEF SUMMARY OF THE INVENTION

The invention provides a gaming system and various games to vehicle drivers who subscribe to the current GPS Racing Games and install a mobile unit on their vehicle. Said mobile unit contains a Global Positioning System (GPS) for providing location information to a processor, an inertial navigation system (INS) for providing racing information to the processor; a transceiver communicating with a remote database and an I/O control connecting the GPS, the INS and the transceiver with a processor and a memory module. The mobile unit is operated through a keypad and features a display to present the processed information to the user. Through the keypad user can also enter additional data necessary for specific games.

The mobile unit's processor readable memory unit has encoded software instructions for fetching racing information, providing a menu to a user, receiving one or more race requests from the user, fetching the race information from the remote database, fetching GPS information, fetching information entered by the user, formatting the race information in hypertext markup language and transmitting the hypertext markup language to the display.

Depending on the chosen game, racing information is sent to the database in real-time or after interim storage on the mobile unit's memory unit. The database receiving the user's racing information processes said information and presents the results on a server that can be accessed by the user via Internet.

The web server has software allowing a user to play a basic GPS racing game and five variations of it, exemplarily called "Rally," "Scavenger Race," "ABC HOG Style," "Miles of Miles," and "Texas Hold-Em Rally." Moreover, a user can compete GPS Racing Games in real time or as a virtual race based on course, user and vehicle information, in groups or individually, and he can create a group network within which GPS Racing Game rules can be exacerbated to enhance the difficulty of the games offered.

In one embodiment, a global positioning gaming system for racing vehicles comprises a web server, configured to edit and format game data, further configured to be accessible by a user through a computer network; and a database associated with the web server configured to receive and process game information and transmit racing data.

In another embodiment, a client global positioning gaming system for racing vehicles comprises one or more processor(s) configured to execute instructions, a computer readable memory medium coupled to the processors for storing instructions, which when executed on the processors causes the processors to collect information and store collected information in the memory; one or more mobile unit execution modules coupled to one or more vehicles, said mobile unit execution modules each comprises a global positioning system for providing location information to a processor; an inertial navigation system with one or more sensor units attached to an driving train providing movement information to a one or more processors; a transceiver for providing communication between the mobile unit execution modules and a remote database; a keypad user input device coupled to the processors configured to receive input from one or more users; one or more processor readable memory units coupled to said processor; wherein said unit is configured to store information collected by the processor; an I/O control coupled to the processor and coupled to the inertertial navigation system and coupled to the global positioning system and coupled to a transceiver; and a display unit coupled to the processors, for displaying information to a user, wherein the information includes a relative position to at least one other user.

In another embodiment, the client global positioning gaming system for racing vehicles information that is displayed to a user includes program code for a relative position to a previous game instance from said user.

In yet another embodiment, the client gaming system computer readable medium of the client global positioning gaming system for racing vehicles further comprises program code for retrieving the collected information from the memory at the client; program code for transmitting at least part of the collected information to the database associated with the server; wherein the collected information includes one or more data instances selected from the group consisting of: location information, miles, time, speed, elevation changes, lateral g-force, positive and negative acceleration, gear shifts and miles per gear shift.

In another embodiment, a method of providing vehicular race information comprises providing a menu to a user; receiving a request from the user for location and time information for the race; fetching the race information from a database; fetching the race information for the inertial navigation system; fetching global positioning system information; fetching information entered by the user; transmitting racing information to the transceiver; formatting the race information into a machine readable language; transmitting the formatted race information to the client associated with the user; receiving from the user a request for time and location information; and displaying to the user one or more races on an electronic display screen.

In another embodiment, a method of providing a virtual racing system comprises collecting from the user movement information; applying the information to a known course to calculate the result of said user with said vehicle on said course; comparing the user results with the results of various users; and displaying the results on the web server.

In another aspect of the embodiment the method includes user movement information, average measurement data of said user and said vehicle and ratings of said user and said vehicle.

In another embodiment, a method of providing a basic global positioning system racing game comprises accessing a remote database through a mobile unit located locally on a vehicle; retrieving race information from a remote database; providing one or more geographical location coordinates in a set of related structured data, said data capable of graphical or tabular page views to define at least one or more race points and an associated race course; overlying associating one or more realt time vehicle race points onto the a known race course; recording of racing data by activating a the keypad user input device affixed to the mobile unit; calculating one or more race parameters; traversing a course using information received on the user's mobile unit; collecting racing information and transmitting this information from the mobile unit to the remote database in real time or after storing the information on the mobile unit's memory; continuously storing, processing and plotting the position of said information at said remote database; ending the plotting, recording and transmitting of racing information by deactivating the keypad; processing and comparing results of various users obtained at different times by the remote database; and making results available on the web server.

In another aspect of the embodiment, the method variously includes receiving predetermined information, wherein the information includes waypoint coordinates and corresponding target times for said predetermined waypoints; measuring elapsed times and average speed between waypoints; awarding cards to users, wherein the cards' ranking in the hierarchy corresponds with the user's racing times' proximity to the games target time and transmitting clues from the remote database to the vehicle's mobile unit.

In another aspect of the embodiment, the method variously includes transmitting various sets of information from the remote database to the vehicle's mobile unit wherein the information correlates with an actual location, and matching the various sets of information with the correlating actual locations by the user.

In another aspect of the embodiment, the method variously includes transmitting and receiving specific waypoint coordinates and corresponding target times for said predetermined waypoints; measuring an elapsed time and calculating average speed between waypoints at first waypoint and second waypoint, each having respective time stamps logged by the GPS system; providing an award to a user based on actual time associated with user; storing two or more race times per race; and comparing times associated with users according to Texas-Hold-Em rules.

In another embodiment, a method of racing a GPS Racing Game comprises racing a game in units with others, wherein the group member's scores obtained from the GPS Racing Game accumulate and are ranked.

In another embodiment, a method of racing a GPS Racing Game comprises providing a private race game playable only by users designated by another user, wherein an administrator may control rules associated with a private group.

In another aspect of the embodiment for providing a method of a virtual racing game, the method may variously include a method for providing a first racing game set of rules further comprising the following steps: logging in through an interface located locally or through the interne retrieving race information from the remote database; starting the recording of racing information by pressing the keypad activating the mobile unit; transmitting and receiving predetermined waypoint coordinates and corresponding target times for said predetermined waypoints; operating the vehicle and transiting a course using information received on the user's mobile unit; continuously collecting racing information and transmitting this information from the mobile unit to the remote database in real time or after storing the information on the mobile unit's memory; continuously storing, processing and plotting the position and said information at said remote database; measuring elapsed times and average speed between waypoints; ending the data collection, recording and transmitting of racing information by pressing the keypad; comparing results between different users at different times by the remote database; awarding cards to users, wherein the cards' ranking in the hierarchy corresponds with the user's racing times' proximity to the games target time and displaying the results on a web server.

In another aspect of the embodiment for providing a method a virtual racing game, a method for providing a second racing game set of rules variously comprises logging in through an interface located locally or through the internet retrieving race information from the remote database; starting the recording of racing information by pressing the keypad activating the mobile unit; transmitting a first clue from the remote database to the vehicle's mobile unit, operating the vehicle to coordinates of the first clue; unraveling clue by clue and racing to the coordinates of the den of the next clue in order to complete the progressively received mapped course; continuously collecting racing information and transmitting this information from the mobile unit to the remote database in real time or after storing the information on the mobile unit's memory; continuously storing, processing and plotting the position and said information at said remote database; ending the plotting and the recording and transmitting of racing information by pressing the keypad; comparing results between different users at different times by the remote database; and displaying the results on a web server.

In another aspect of the embodiment for providing a method a virtual racing game, a method for providing a third racing game set of rules variously comprises logging in through an interface located locally or through the internet retrieving race information from the remote database; starting the recording of racing information by pressing the keypad activating the mobile unit; transmitting various sets of information from the remote database to the vehicle's mobile unit wherein the information correlates with an actual location, matching the various sets of information with the correlating actual locations by the user; operating the vehicle to coordinates of the locations; continuously collecting racing information and transmitting this information from the mobile unit to the remote database in real time or after storing the information on the mobile unit's memory; continuously storing, processing and plotting the position and said information at said remote database; ending the plotting, recording and transmitting of racing information by pressing the keypad; comparing results between different users at different times by the remote database; and displaying the results on a web server.

In another aspect of the embodiment for providing a method a virtual racing game, a method for providing a fourth racing game set of rules variously comprises logging in through an interface located locally or through the internet retrieving race information from the remote database; overlaying race points onto map; starting the recording of racing information by pressing the keypad activating the mobile unit; calculating race parameters; operating the vehicle and transiting a course using information received on the user's mobile unit; continuously collecting racing information and transmitting this information from the mobile unit to the remote database in real time or after storing the information on the mobile unit's memory; continuously storing, processing and plotting the position and said information at said remote database; continuously plotting the position of the various users on a map by the remote database; ending the plotting and the recording and transmitting of said information by pressing the keypad; comparing results between different users at different times by the remote database; and displaying the results on a web server.

In another aspect of the embodiment for providing a method a virtual racing game, a method for providing a fifth racing game set of rules variously comprises logging in through an interface located locally or through the internet retrieving race information from the remote database; starting the recording of racing information by pressing the keypad activating the mobile unit; transmitting and receiving specific waypoint coordinates and corresponding target times for said predetermined waypoints; operating the vehicle and transiting a course using information received on the user's mobile unit; continuously collecting racing information and transmitting this information from the mobile unit to the remote database in real time or after storing the information on the mobile unit's memory; continuously storing, processing and plotting the position and said information at said remote database; measuring elapsed times and average speed between waypoints lodged via GPS and time stamps; awarding cards to users, wherein the cards' ranking in the hierarchy corresponds with the user's racing times' proximity to the games target time; retaining two of the maximum obtainable five cars per race; ending the data collection, recording and transmitting of racing information by pressing the keypad; comparing results and the card combinations of different users by the remote database according to Texas-Hold-Em rules; and displaying the results on a web server.

In another aspect of the embodiment for providing a method a virtual racing game, a method for providing a sixth racing game set of rules variously comprises a game set of rules in units with other users wherein the group members' scores obtained for any GPS Racing Game accumulate and are ranked.

In another embodiment, the method for providing a GPS Racing Game includes steps wherein one or more users create private groups restricting access to members only; and wherein group administrators can exacerbate rules and increase the difficulty of said games.

The construction and method of operation of the embodiments disclosed herein, however, together with additional objectives and advantages thereof, will be best understood from the following description of specific, exemplary embodiments when read in connection with the accompanying drawings.

BRIEF DESCRIPTION OF THE DRAWINGS

FIGS. 7 a and b show two alternatives a variation of the GPS Racing Game, exemplarily called "Scavenger Race."

FIG. 12 is an exemplary course output and recorded data table.

DETAILED DESCRIPTION

Figure 1:
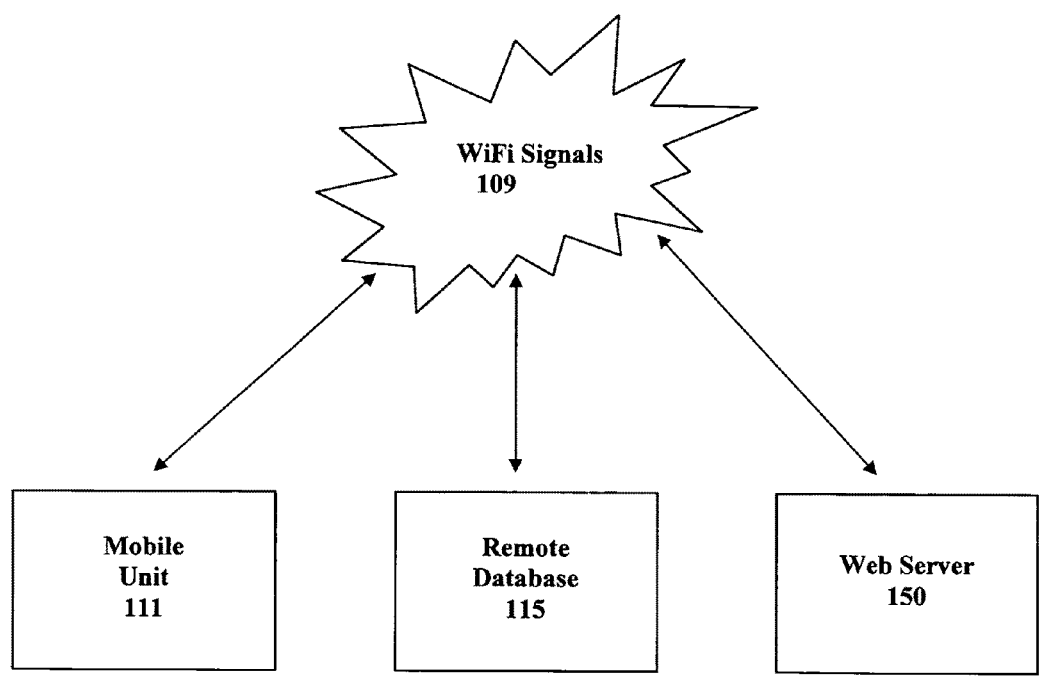
FIG. 1 shows a system block diagram of one embodiment of the current invention.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Exemplary Operating Environments, Components, and Technology

Figure 14:
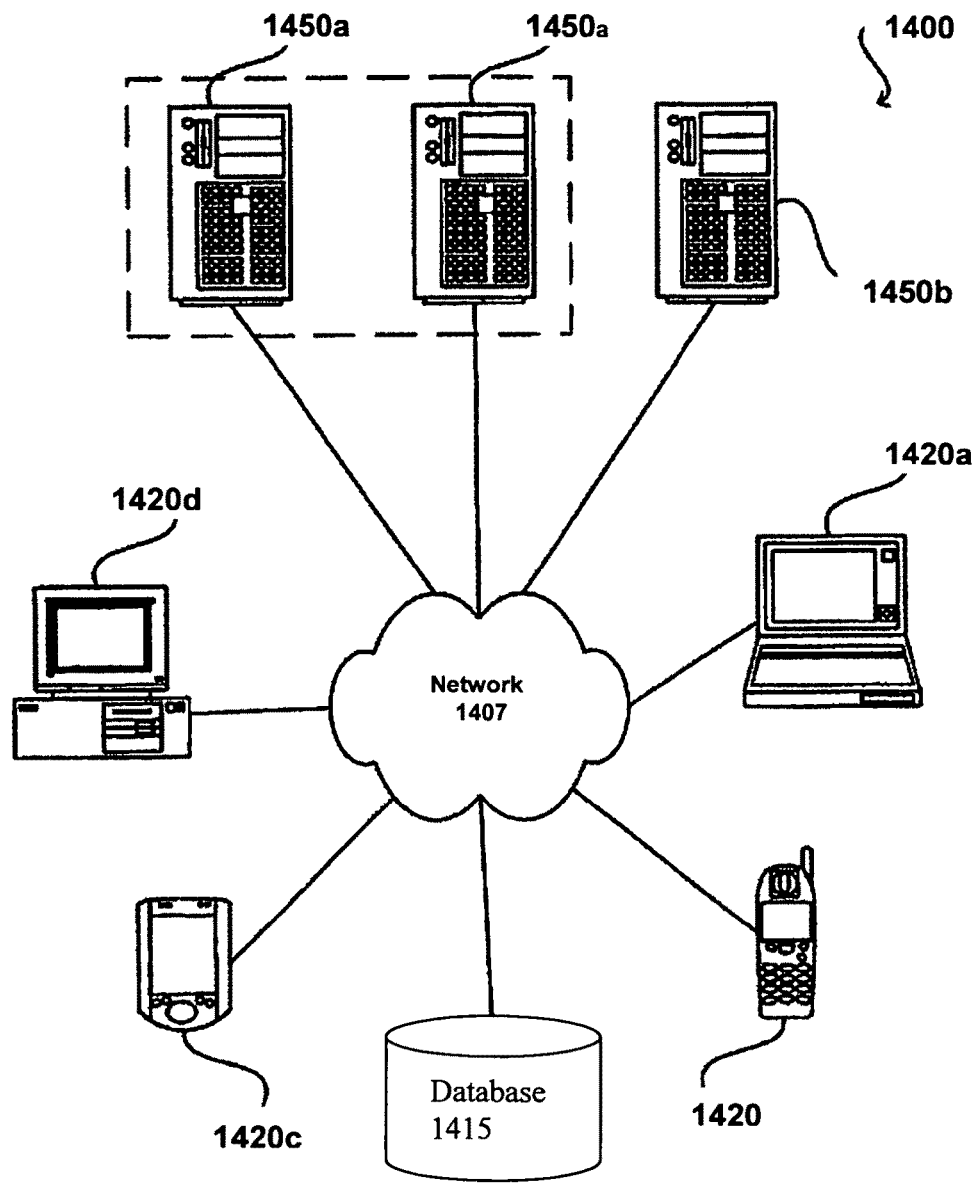
FIG. 14 is an exemplary network operating environment coupled to the GPS racing database repository.

FIG. 14 is a block diagram illustrating components of an exemplary operating environment in which embodiments of the present invention may be implemented. The system 1400 can include one or more user computers, computing devices, or processing devices 1420a, 1420b, 1420c, 1420d, and 1420f which can be used to operate a client, such as a dedicated application, web browser, etc. The user computers 1420a, 1420b, 1420c, 1420d and 1420f can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1420a, 1420b, 1420c, 1420d and 1420f may also have any of a variety of applications, including one or more development systems, database client and/or server applications, and Web browser applications. Alternatively, the user computers 1420a, 1420b, 1420c, 1420d and 1420f may be any other electronic device, such as a thin-client computer, Internet-enabled gaming system, and/or personal messaging device, capable of communicating via a network (e.g., the network 1407 described below) and/or displaying and navigating Web pages or other types of electronic documents. Although the exemplary system 1400 is shown with four user computers, any number of user computers may be supported.

In most embodiments, the system 1400 includes some type of network 1407. The network can be any type of network familiar to those skilled in the art that can support data communications using any of a variety of commercially-available protocols, including without limitation TCP/IP, SNA, IPX, AppleTalk, and the like. Merely by way of example, the network 1407 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1420a, 1420b which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1420a) may be dedicated to running applications, such as a business application, a Web server, application server, etc. Such servers may be used to process requests from user computers 1420a, 1420b, 1420c, 1420d. The applications can also include any number of applications for controlling access to resources of the servers 1450a, 1450b.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1420a, 1420b, 1420c, 1420d. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1420a, 1420b, 1420c, 1420d.

The system 1400 may also include one or more databases 1415. The database(s) 1415 may reside in a variety of locations. By way of example, a database 1415 may reside on a storage medium local to (and/or resident in) one or more of the computers. Alternatively, it may be remote from any or all of the computers 1420a, 1420b, 1420c, 1420d, 1450a, 1450b, 1415 and/or in communication (e.g., via the network 1407) with one or more of these. In a particular set of embodiments, the database 1120 may reside in a storage-area network ("SAN") familiar to those skilled in the art. Similarly, any necessary files for performing the functions attributed to the computers 1420a, 1420b, 1420c, 1420d, 1450a, 1450b, 1415 may be stored locally on the respective computer and/or remotely, as appropriate. In one set of embodiments, the database 1415 may be a relational database, such as Oracle 10 g, that is adapted to store, update, and retrieve data in response to SQL-formatted commands.

Figure 15:
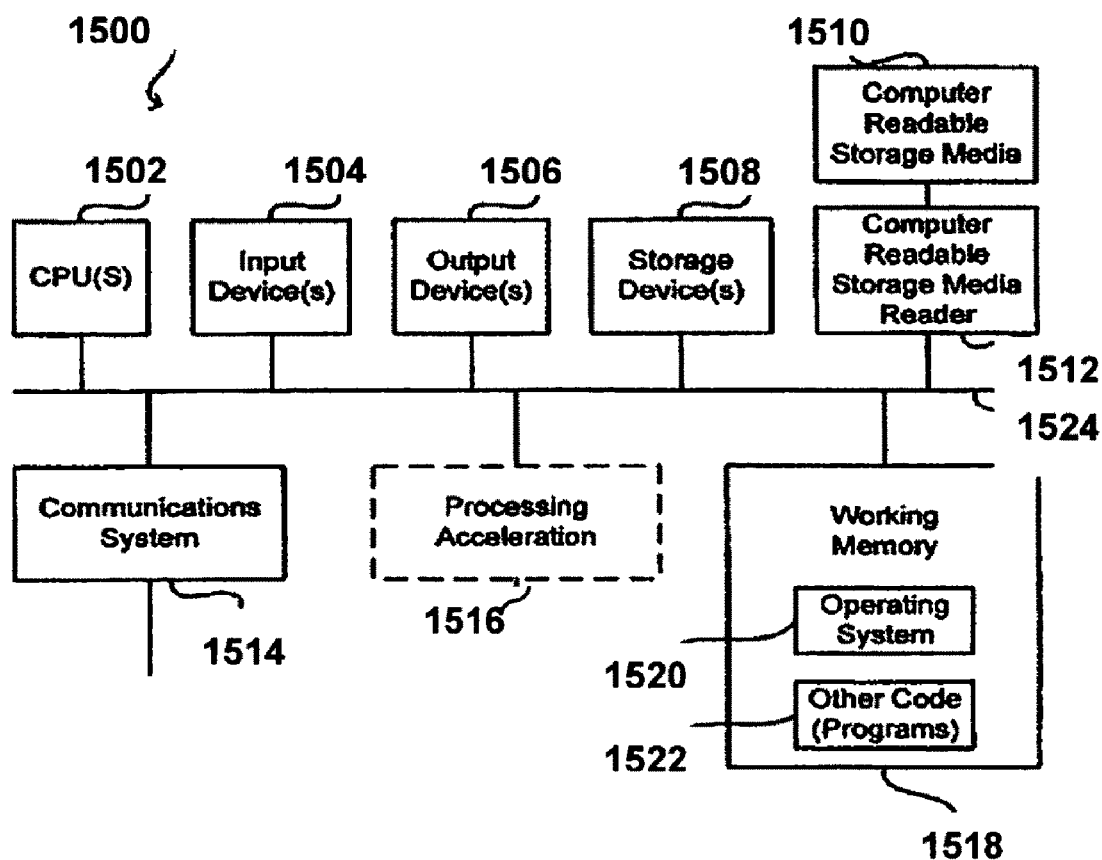
FIG. 15 is an exemplary computing architecture diagram to interface with program code for the GPS racing game system.

FIG. 15 illustrates an exemplary computer system 1500, in which embodiments of the present invention may be implemented. The system 1500 may be used to implement any of the computer systems described above. The computer system 1500 is shown comprising hardware elements that may be electrically coupled via a bus 1524. The hardware elements may include one or more central processing units (CPUs) 1502, one or more input devices 1504 (e.g., a mouse, a keyboard, etc.), and one or more output devices 1506 (e.g., a display device, a printer, etc.). The computer system 1500 may also include one or more storage devices 1508. By way of example, the storage device(s) 1508 can include devices such as disk drives, optical storage devices, solid-state storage device such as a random access memory ("RAM") and/or a read-only memory ("ROM"), which can be programmable, flash-updateable and/or the like.

The computer system 1500 may additionally include a computer-readable storage media reader 1512, a communications system 1514 (e.g., a modem, a network card (wireless or wired), an infra-red communication device, etc.), and working memory 1518, which may include RAM and ROM devices as described above. In some embodiments, the computer system 1500 may also include a processing acceleration unit 1516, which can include a digital signal processor DSP, a special-purpose processor, and/or the like.

The computer-readable storage media reader 1512 can further be connected to a computer-readable storage medium 1510, together (and, optionally, in combination with storage device(s) 1508) comprehensively representing remote, local, fixed, and/or removable storage devices plus storage media for temporarily and/or more permanently containing, storing, transmitting, and retrieving computer-readable information. The communications system 1514 may permit data to be exchanged with the network and/or any other computer described above with respect to the system 1500.

The computer system 1500 may also comprise software elements, shown as being currently located within a working memory 1518, including an operating system 1520 and/or other code 1522, such as an application program (which may be a client application, Web browser, mid-tier application, RDBMS, etc.). It should be appreciated that alternate embodiments of a computer system 1500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

FIG. 1 shows a system block diagram of one embodiment of the current invention. The system is comprised of a mobile unit 111 for collecting the location information from a vehicle such as a motorcycle and transmitting this information to a database. The first processor is a wireless mobile unit receiving WiFi (802.11) signals or IEEE 802.15.4 radio waves 109 standard for wireless networks (ZIGBEE) affixed to the user's vehicle. The first mobile unit 111 transmits information collected to a remote database 115 and receives information from same database 115. The database 115 is internet accessible and stores digital information that it received from the user's mobile unit and sends WiFi signals or radio waves 109 to the mobile unit. The mobile unit 111 transmits information in near real-time or may, for certain games, store time and location information and transmit a position history at a predetermined time, thus allowing for ease of communications. The remote database 115 stores the information received through WiFi Signals 109 for access by a server 150. The server 150 processes the transmitted information and provides for presenting the results to one or more users who raced and subscribed for accessing the information on the server.

In view of the foregoing the server 150 may also calculate vehicle performance parameters for comparison between differing competitors. These parameters may include, but are not limited to, maximum acceleration, acceleration into turns, stopping distances and maximum speeds. A velocity profile may be calculated relating velocities to location characteristics for determining user performance on turns. The accelerometer may also calculate a base engine vibration profile for determining a unique "vibration stamp" to identify the vehicle.

Further, the server 150 may execute a prediction simulation or modeling. It, thereto, determines generalized parameters to estimate how competitors would perform on other courses based on their rating and their motorbike's rating. The user rating, in particular, is determined according to the rider's performance from actual competitions. This authentic gathered data is transcribed to a defined new course and its features. Such "virtual racing" is possible on a genuine course or on an imaginary, videogame-like course. By the same token, the user can actual race on a virtual course.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
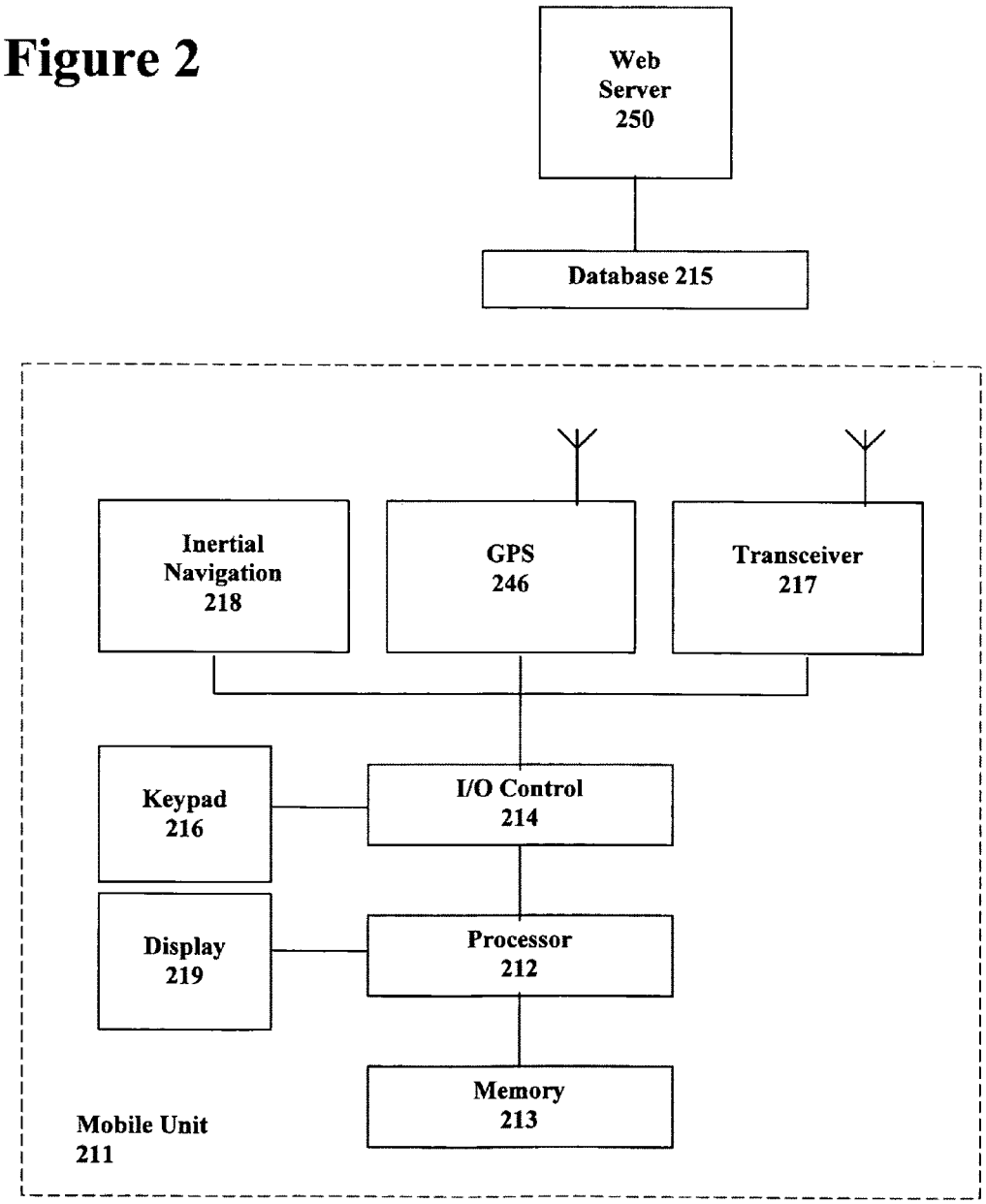
FIG. 2 is a block diagram of a mobile unit according to one embodiment of the current invention.

FIG. 2 is a block diagram of a mobile unit 211 according to one embodiment of the current invention. The mobile unit 211 is designed to be affixed to a vehicle such as a motorcycle, automobile, snowmobile or bicycle that is used to compete in the GPS races. In the mobile unit 211 is a processor 212 coupled to a memory 213 for storing program instructions and location information. The processor 212 is also coupled to an Input Output (I/O) control 214 for communicating with communication equipment, peripherals and transducers. The I/O control 214 is an interconnection means and couples the processor 212 through to an inertial navigation system 218 which is connected to the vehicle. Moreover, a GPS receiver 246 is coupled to the processor 210 through the I/O control 214 for providing location information received from the remote database. Finally, a transceiver 217 is coupled to the processor 212 through the I/O control 214 for providing communication to the remote database 215 and thereby to the web server 250 according to the protocols discussed above.

The transceiver 217 receives WiFi (802.11) signals or IEEE 802.15.4 radio waves and serves as the dispatch connection of the mobile unit 211 to a remote database 250. This allows the processor 212 to transmit racing information including location information, miles, time, Speed, elevation changes, Lateral G-Force, positive and negative acceleration, gear shifts, miles per gear shift and other performance parameter data, received from the inertial navigation system 218 to the remote database 215. The processor has encoded software instructions for fetching this racing information, receiving one or more race requests from the user, fetching race information from the remote database, fetching GPS information, and for formatting the race information in hypertext markup language. This hypertext markup language is transmitted to a display 219 where the information is displayed to the user. The processor 212 is also coupled to a keypad 222 having two control keys allowing a user to operate the device.

To operate the mobile unit 211 embodied in FIG. 2, a user selects a first keys on the keypad 216 to signal the processor to start recording position information. The user then begins to operate the vehicle over a predetermined course while the processor 212 collects time and position information. Moreover, the processor 212 collects racing information from the inertial navigation system 218 including the user's location information and correlates this information with information received from the GPS 246 to provide a reliable record of vehicle location and time and the user's racing performance. The transceiver 217 transmits all this racing information collected by the processor to the remote database 215 in real time or, in certain games, may store the information in a memory 213 for later transmission to the remote database 215 or any combination thereof. At the end of the predetermined course the user select a second key on the keypad 216 to indicate to the processor 212 the course is complete. Once complete, the course time and location information is transmitted through the transceiver 217 to a centralized storage database 215 for further analysis.

In the current embodiment a competition between multiple users may take place by having a first competitor, equipped with a first mobile unit 211, begin to collect location information at a first predetermined location, run a predetermined course according to the information received through the GPS 246, collecting further location information along that way, and transmitting the location history through the transceiver to the remote database 215 or temporarily storing it on a memory 213. A second competitor similarly equipped with a mobile unit 211 begins collecting position information at the first predetermined location, runs the predetermined course while collecting location information, temporarily stores the information in the memory 213 and transmits the information to the remote database 215. After the first and second competitor provide location histories, the server 250 compares the results to determine a winner.

One having skill in the art will appreciate that information from the inertial navigation information 218 and the GPS 246 complement each other and various algorithms are available to calculate reliable location information from diverging sources. These include but are not limited to Kalman filtering, digital filtering and Bayesian filtering. It would also be in the spirit of this invention to derive acceleration information from GPS 246 alone without an inertial navigation system. Also the calculations may be performed in the mobile unit 211 to reduce the amount of information required for transmission or the raw data or a combination of calculated data and raw data may be transmitted such that more reliable time and position information is derived at another point in the system.

Figure 3A:
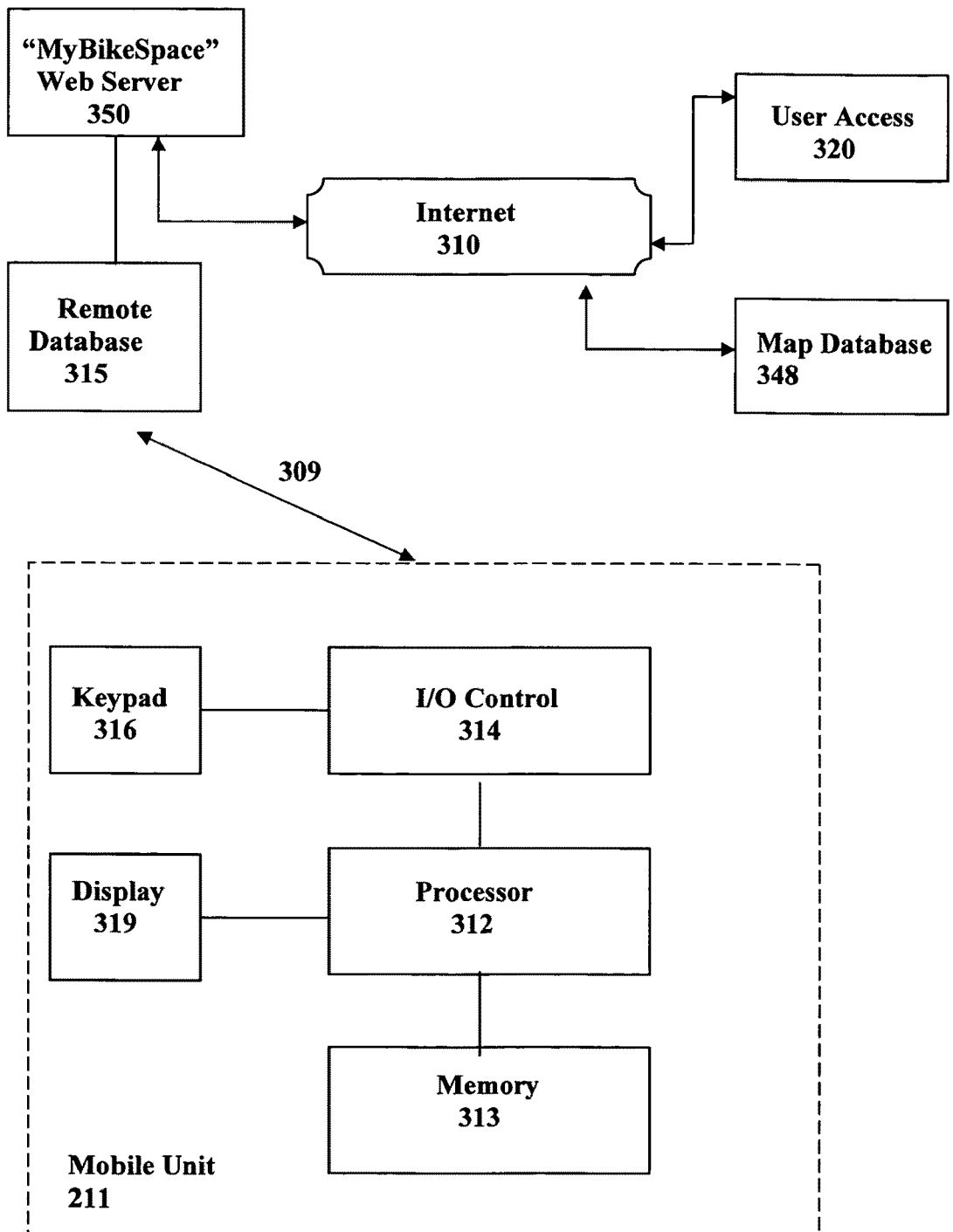
FIG. 3a is a functional block diagram of one embodiment of the current invention of a web server accessed by a user through an internet connection and fed with information from the mobile unit.

FIG. 3 is a functional block diagram of one embodiment of a server 350 connected to the Internet 310. In this embodiment the mobile unit featuring a processor 312, a memory 313, and an I/O control 314 transmits through the previously depicted transceiver information to the remote database 315. The remote database 315 can also be through the Internet 310. The remote database 315 contains time and location information generated by the mobile devices such as the one described in FIG. 2. A user 320 can connect to the server 350 through the Internet 310 using conventional means such as an Internet browser or other interface and request to see information on one or more competitions. The server 350 then fetches the information from the remote database 315, formats the information into one of the Internet standard data formats such as Hypertext Markup Language (HTML), or eXtended Markup Language (XML) and presents the information to the user through the Internet 310. Thus providing competitive information about one or more racers even thought the races were performed at different times.

The web server 350 is exemplarily called "MyBikeSpace". It is utilizing a platform approach that the user can access through the internet 310. The user access 320, allows the user to input his personal and vehicle data. Through the user access the user also can review the presentation of the processed information received at the Web Server 350. Moreover, the Web Server 350 is fed with map coordinates for overlaying the race information onto a standardized map so that users can visualize the results. Alternatively, the Web Server 350 can receive such map coordinates from a Map Database 348 through the internet 310.

One advantage to the current invention is that racers can compete at different times and on different days. Even racers from one generation can compete with racers from another generation on the same course and the same standards. All-time best time, speed, maximum acceleration, stopping distances, consistency, skillfulness, or other performance parameters can be recognized.

Figure 3B:
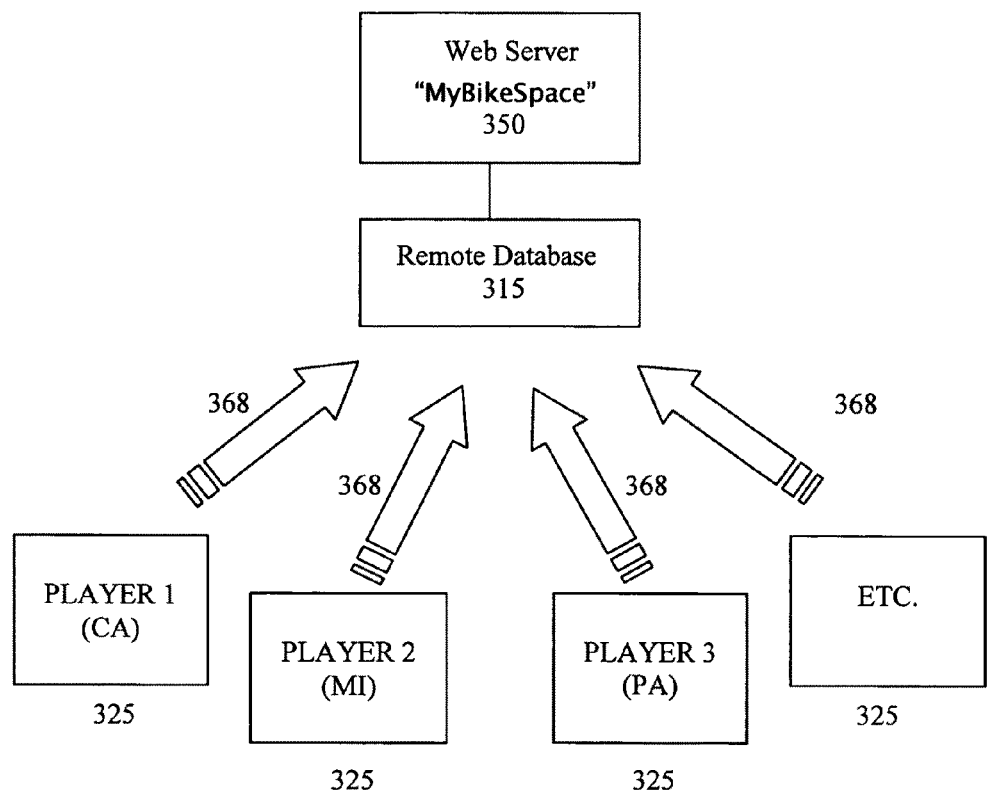
FIG. 3b is a flowchart depicting the equal availability to utilize the current inventions to users located throughout the nation.

The Web Server 350 is the platform that allows users to compete with other players 325 across the nation as shown in FIG. 3b. All users participating in the race, irrelevant from their actual location, immediately transfer 368 their race information from their mobile unit to the web server 350. This allows a disclosure of their scores on the Web Server 350 in virtually real-time.

Figure 4:
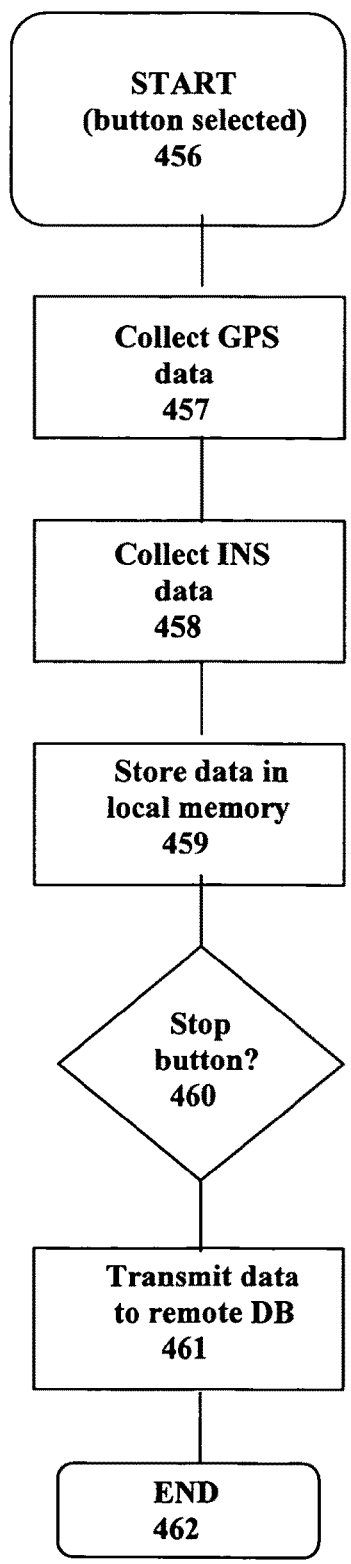
FIG. 4 is a flowchart of one embodiment the basic GPS Racing Game.

FIG. 4 is a flowchart showing one embodiment of software operations for the mobile unit of the current invention. The software is a set of processor instructions encoded into memory to effect the process described herein. Incipiently, a user starts the operation of the mobile unit by selecting the start button 456 from the keypad. The processor polls the GPS data 457 to fetch the current location data. The processor then polls the inertial navigation system (INS) 458 to acquire changes to the current location. Once the GPS and INS data is collected, the processor stores the time and location information in a memory 459 or immediately transfers the data to a remote database. The processor continuously polls the GPS and INS subsystems until a stop signal is detected 460 when the user selects the stop button on the keypad. After the stop signal is detected, the processor uploads the stored time and location information to the remote database 461 or stops its continuous transfer of racing data which constitutes the end of the game 462.

One having skill in the art would appreciate that the mobile unit may transmit information in real-time, near real-time or may store time and location information and transmit a position history at a predetermined time, thus allowing for ease of communications. Also polling rates for the GPS and the INS may be different thus allowing for different race performances such that smaller changes in acceleration are acquired in certain circumstance while major changes in GPS information are recorded less often.

Figure 5:
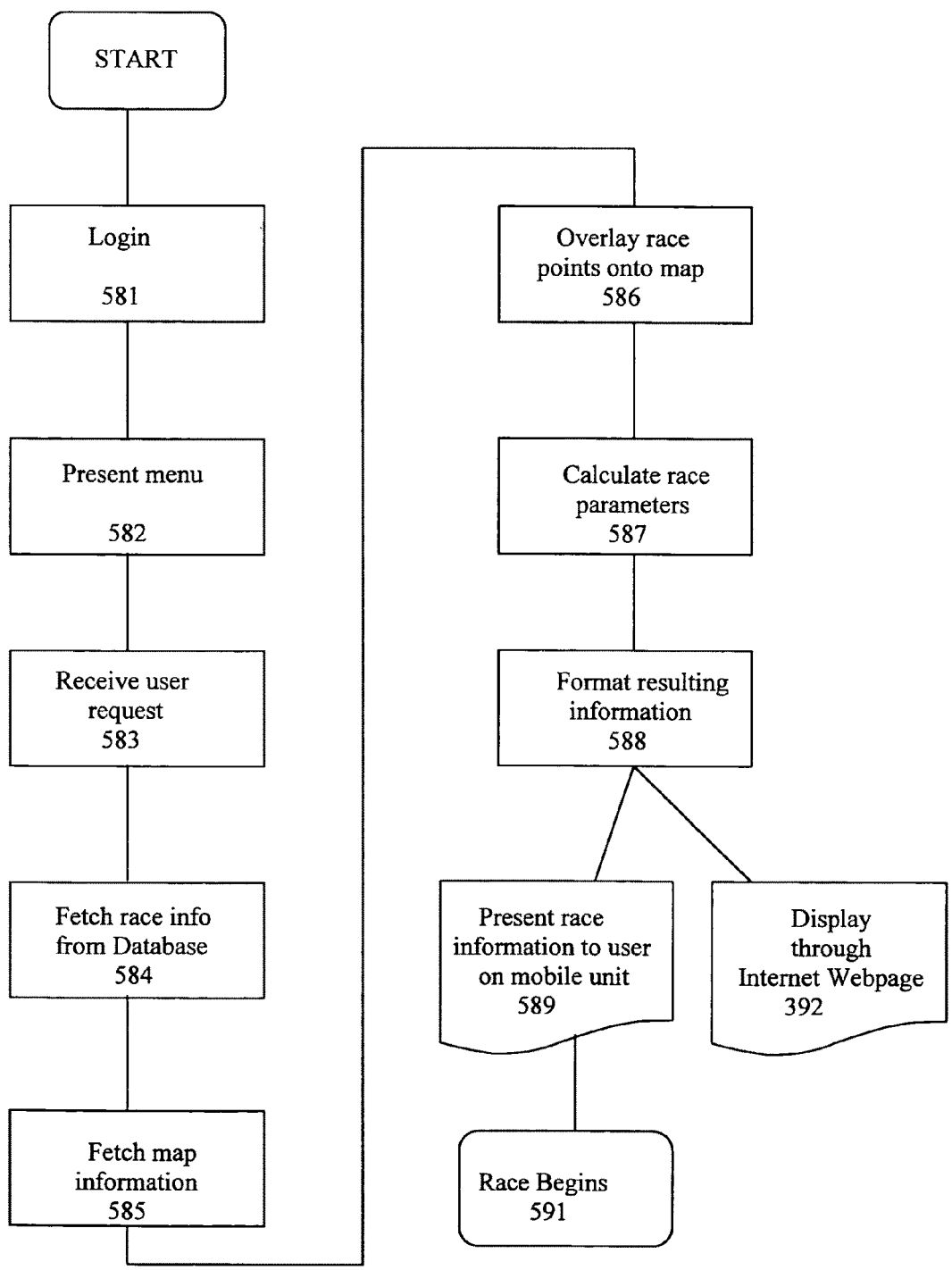
FIG. 5 is a flowchart showing the operation of a server and the mobile unit collecting, processing and transmitting racing information, user data and input data.

FIG. 5 is a flowchart showing one embodiment of the software operation of a server for providing competition information to a user. Incipiently, the user logs in 581 through an interface located locally or connected through the Internet. The GPS Racing software presents a menu wherein the user can select race information 582 such as races, locations, special tasks, information about the competing vehicles and the competing racers. The server receives the requested information 583 according to the user's request and fetches the race information from the remote database 584. In the current embodiment the processor fetches map information 585 corresponding to the location of the race and its pre-mapped course such that race information can be displayed to the user. The processor of the user's mobile unit correlates race information to map information 586 and calculates race parameters 587 such as maximum acceleration and velocity profile and formats the resulting race information 588 to be presented to the user through the user's mobile unit 589; subsequently, the user can begin the race 591. Additionally, the race information is also formatted to be displayed to the user when accessed through the internet 592.

Figure 6:
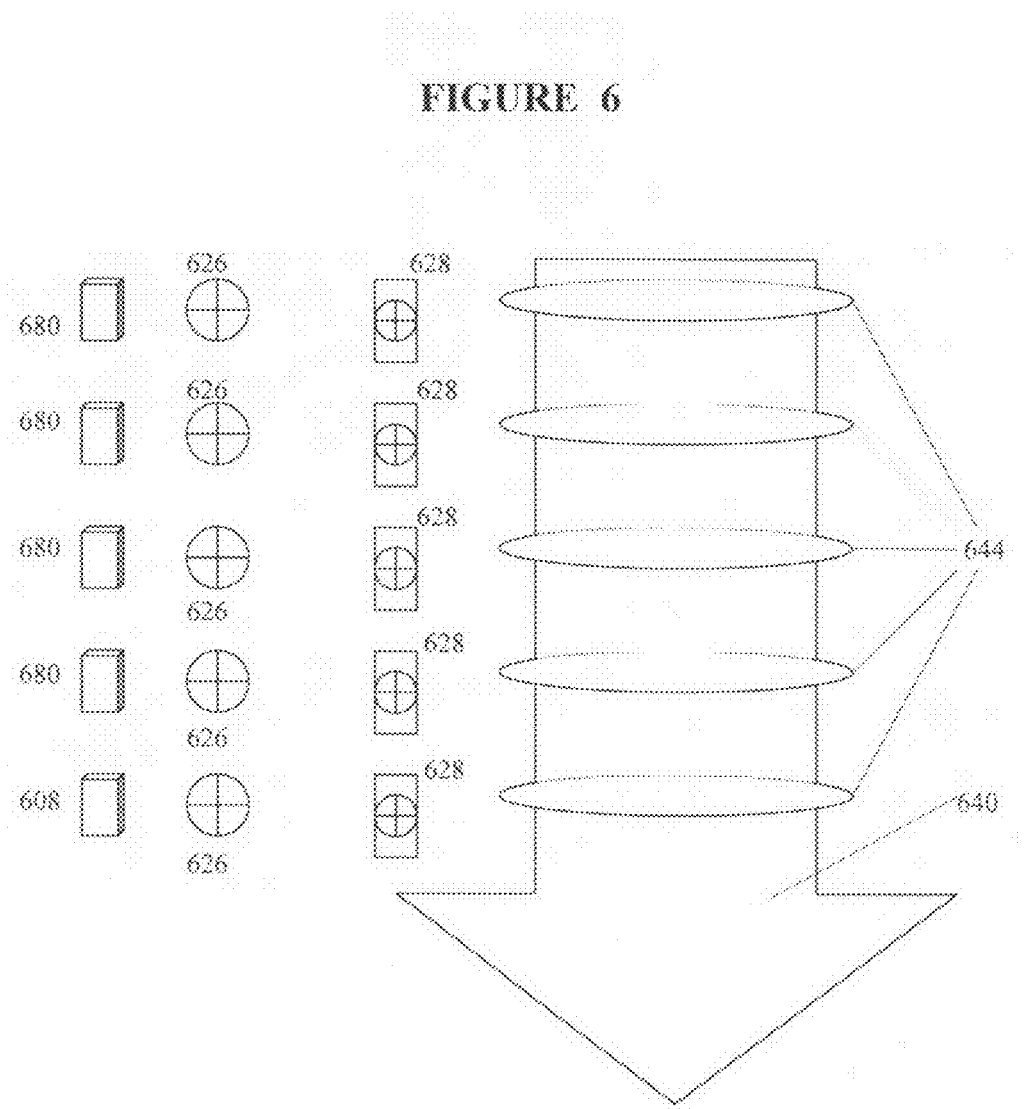
FIG. 6 is a flowchart of an embodiment, a variation of the GPS Racing Game exemplarily called "Rally."

Another embodiment of the invention is shown in FIG. 6. This embodiment features another game exemplary called "Rally." In this game the user receives predetermined GPS coordinates that constitute a mapped course 640 of the race. At various waypoints 644 determined by GPS coordinates, the user's time 626 that elapsed from one waypoint to the next, is lodged via GPS and inertial navigation. At each waypoint the user receives time stamps 628. Based on these time stamps, the user subsequently receives a score as nominal consideration for approximating the "target time" 616. These scores then determine the user's ranking on the MBS site. Alternatively, these time stamps can be playing cards 680 whose hierarchy is associated with the times and proportional to the proximity to an estimated "target" time 626. The course can be completed at any time within a specific period and the user can post all times at once or only stage by stage. The winner receives prizes and awards and the winning numbers are posted on "MyBikeSpace."

FIGS. 7a and b show game number three, exemplarily called "Scavenger Race," which constitutes two further embodiments of the invention. Game number three also resembles basic principles of a scavenger hunt. GPS co-ordinates 745 are provided and clues 764a are given, transmitted 763 from the remote database to the user's mobile unit. According to the first clue, the user attempts to determine the course 740 and the den of the next clue 764a. The user's objective is to obtain the coordinates of all dens by unraveling the clues. Continuously throughout the race, the user's mobile unit transmits data to 761 and receives data from 763 the remote database 715. The first user completing the pre-mapped but initially encrypted course, wins the final prize 766.

Alternatively, shown in FIG. 7b, game number three can be played without given GPS coordinates but merely clues 764b. The user requests and receives 763 the first clue from the web server 750 through the web site 749 or his mobile unit. Again, the clues provide a basis for determining the location of the next disguised clue leading to a final prize 766. Throughout the race the user transmits data from his mobile unit to 761 the remote database 715.

Figure 8:
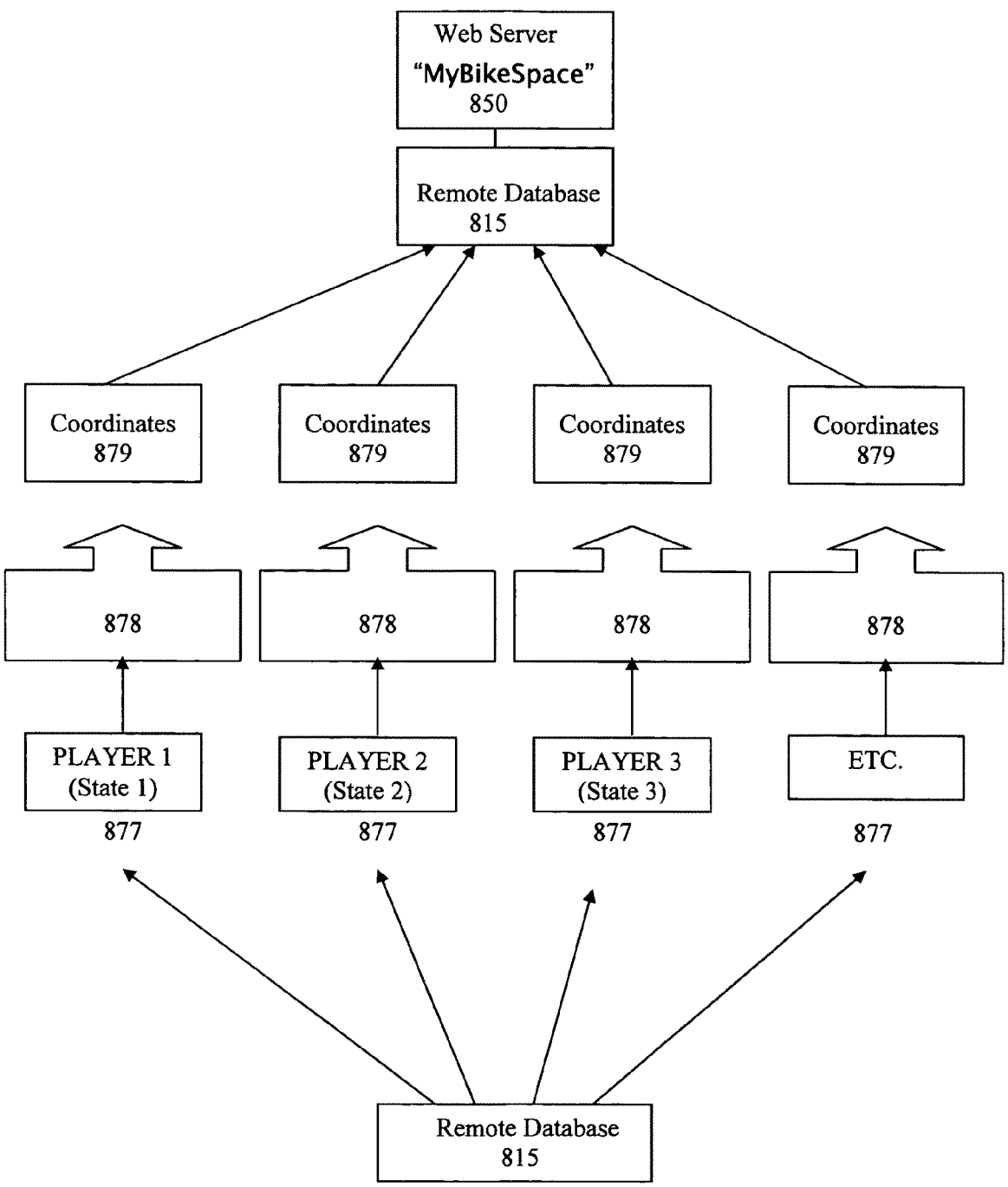
FIG. 8 is a flowchart of an embodiment, a variation of the GPS Racing Game exemplarily called "ABC HOG Style."

An ABC's connatural game in HOGs style is an additional embodiment of the invention shown in FIG. 8. Users have to match information received 877 from the remote database 815 with actual location coordinates 879. The game's results are transferred in real-time to the web server 850 where they are immediately processed. This enables a virtual real-time posting of the users' scores and results on the web-server 850.

Figure 9:
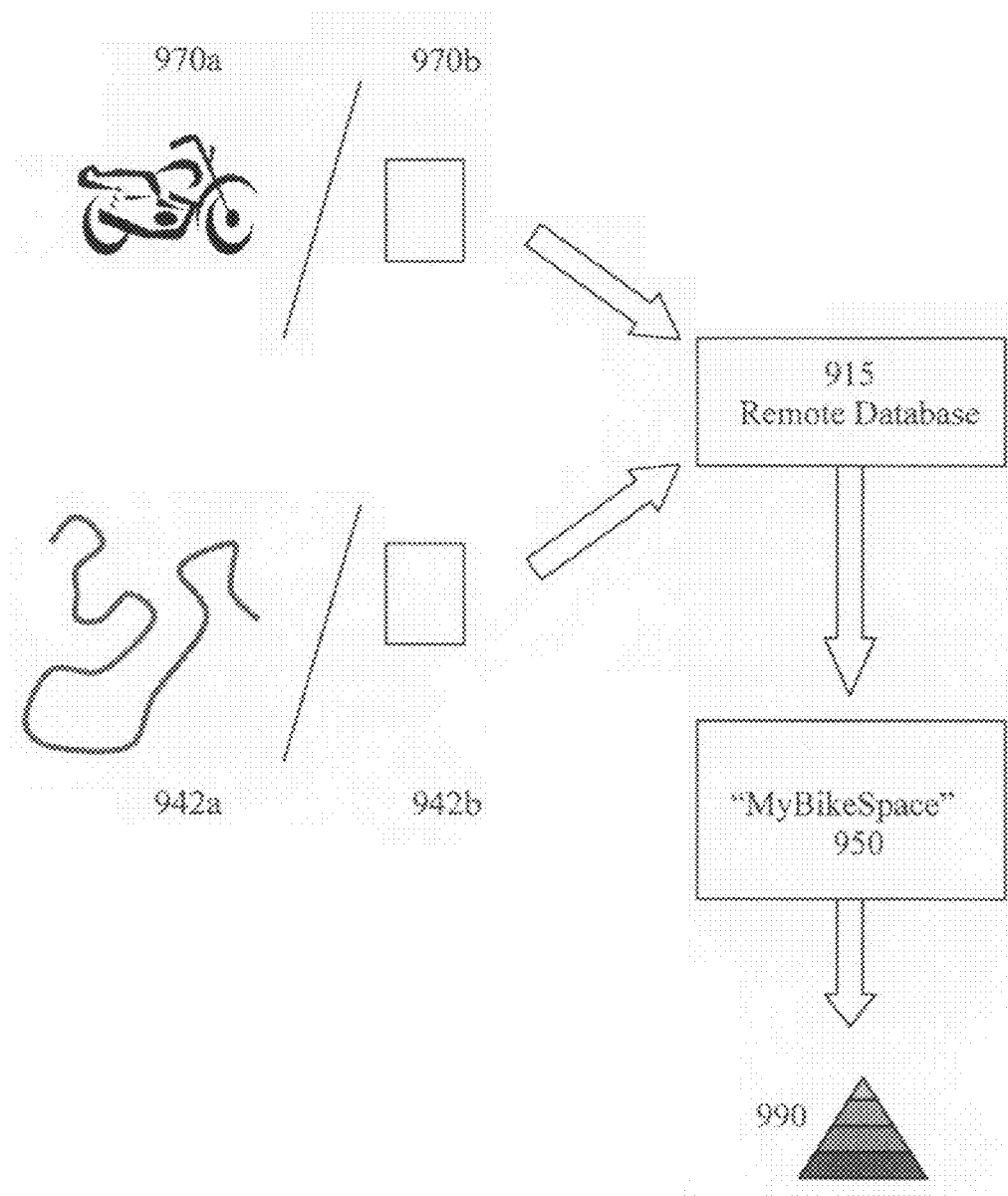
FIG. 9 is a depiction of an embodiment, a variation of the GPS Racing Game, a virtual GPS Racing Game.

Furthermore the invention can be implemented in a virtual manner, FIG. 9. The web server 950 is fed with the operating figures of the user's motorcycle 970a or an excogitated motorcycle 970b as well as the parameters of a course that the user has ridden 942a or the computed performance parameters of an excogitated course 942b. The web server 950 computes a statistical analysis 990 based on the user's rating, the user's vehicle's rating or the vehicle's characteristics, and the particulars of the course. According to these entered or estimated parameters, and the evaluated performance the user is allotted a hypothetical running time and a score. This score is then transmitted to the web server 950 where the user can access the ranking of his statistical analysis 990 as well as the analysis of other users.

Figure 10:
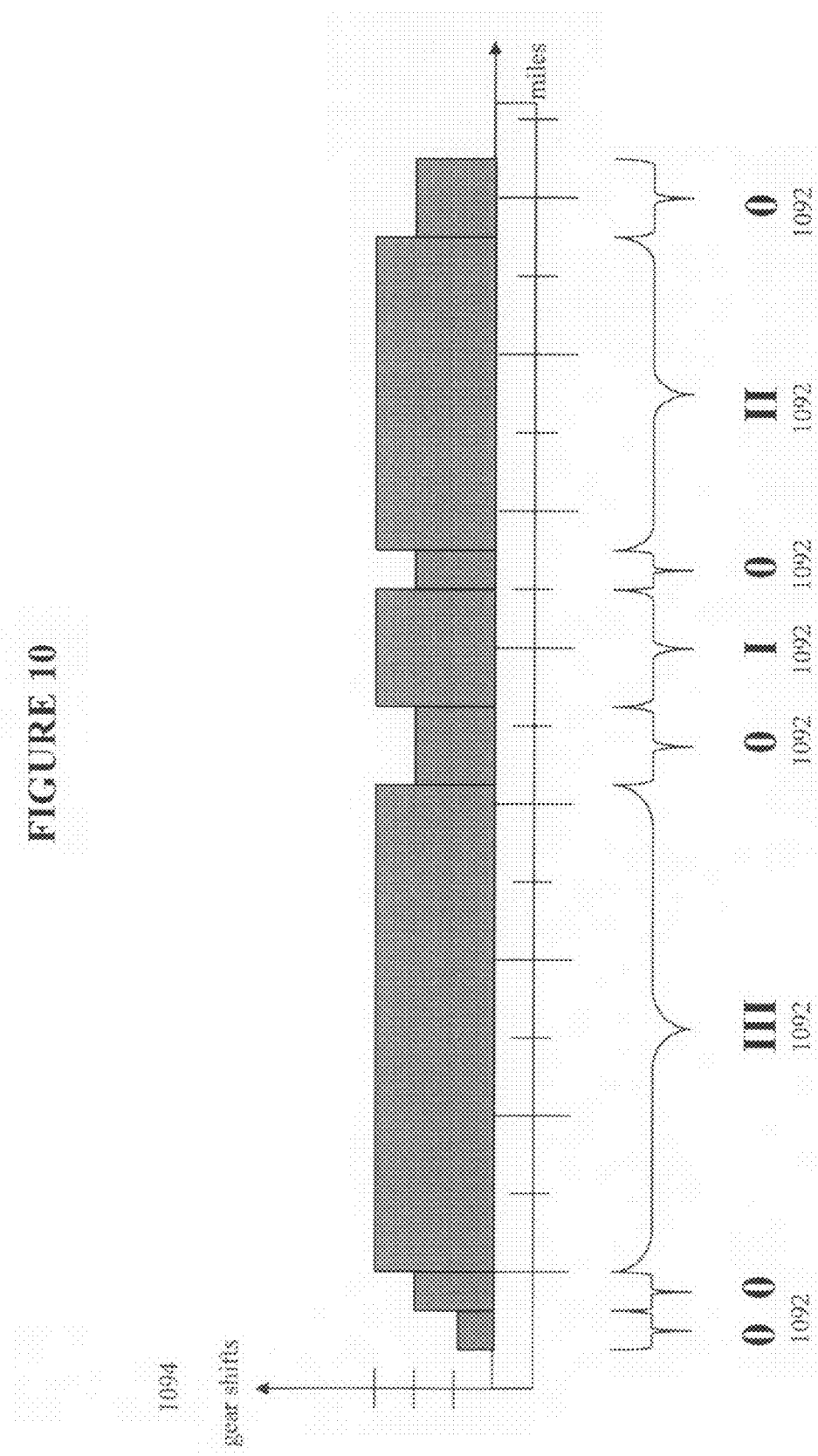
FIG. 10 shows another variation of the GPS Racing Game exemplarily called "Miles of Miles."

Another embodiment is game number seven, exemplary called "Miles of Miles," which is depicted in FIG. 10. This game relates to a tracking of acceleration determined by the number of miles 1092 per gear shift 1094. The number of shifts per mile is then transmitted to the web server and compared to the results of other users. A ranking is drawn up according to which an annual or, alternatively, a monthly prize is awarded.

Figure 11:
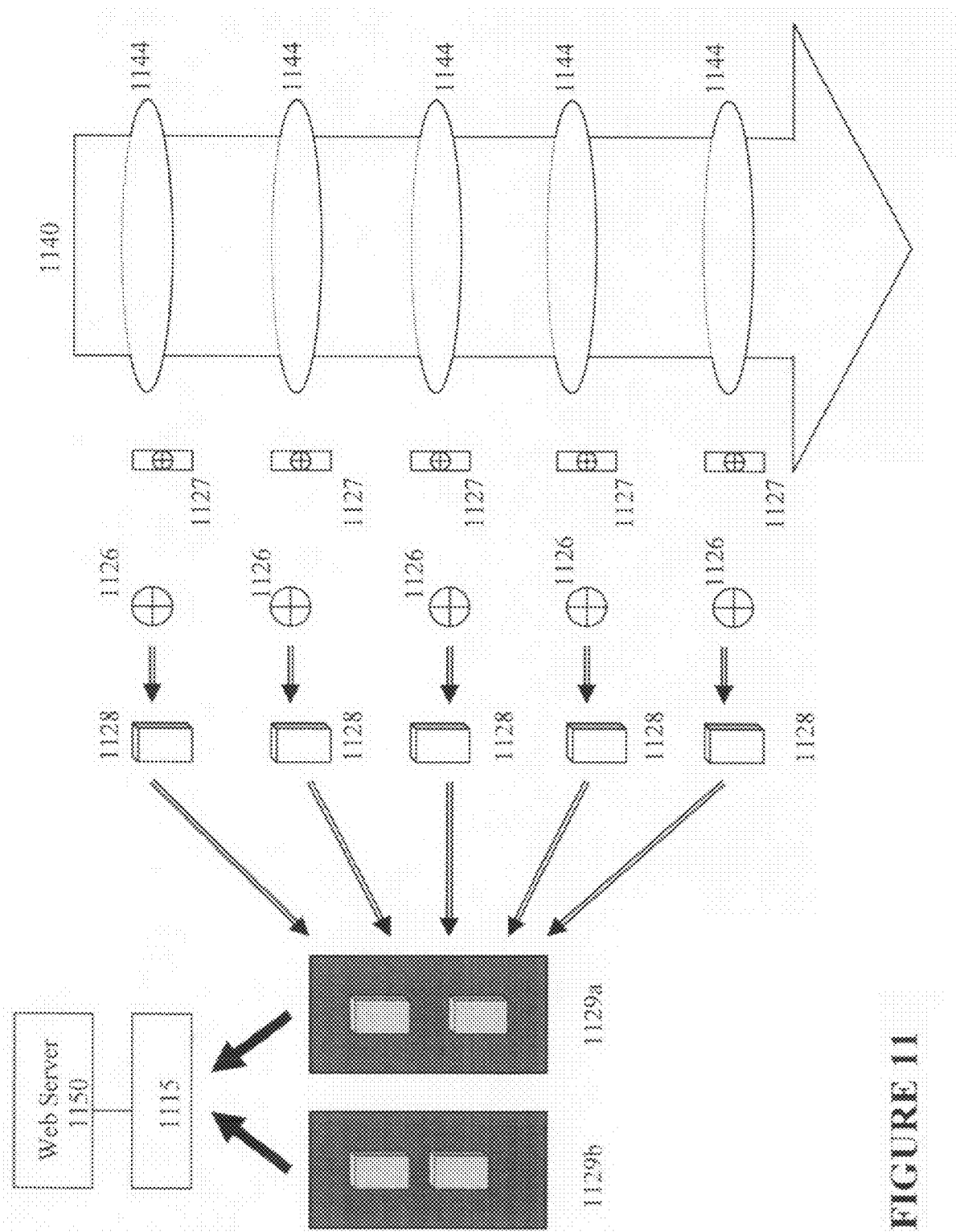
FIG. 11 is a depiction of an embodiment, a variation of the GPS Racing Game exemplarily called "Texas Hold-Em Rally."

Similar to game number two, exemplarily called "Rally," the invention can be implemented as a exemplarily called "Texas Hold-Em Rally" game which is shown in FIG. 11. The waypoints on the course 1140 and the user's running times from waypoint to waypoint are lodged via GPS location 1144 and time stamps 1127. At each waypoint, the user receives playing cards 1128 whose hierarchy are associated with the user's times and proportional to the proximity to an estimated "target" time 1126. The user can obtain five cards 1128 per course 1140 at most but is only allowed to retain two 1129a of the five cards. The web server compares the user's card combination with the card combinations of other users 1129b and generates and posts the highest cards combination according to Poker rules on the web server 1150.

A further embodiment of the invention is that users can form groups. These groups accumulate the scores of the individual users and can compete other groups.

Another embodiment of the invention is that groups have the option to set up their own rallies and prizes. Groups can invite other groups to join their individual race and can compete in the game's various races separately from the main program used by other users.

The basic input and measurement data the invention depicts is shown by way of example in the table of FIG. 12. In particular, this data is the course output 1241 and the respective recorded data 1230. The course output 1241 states the number assigned to the user 1224, the type of motorcycle ridden 1270, the IED number of the motorcycle 1274, the specific course number 1243 and its MBS rating 1247, as well as the rating for the rider 1275 and for his motorbike 1272, all based on the user's input. For example, this is User #101, riding motorcycle 2004 Yamaha TX 650, with IED Number 54321, on course number 12345, whose MBS course rating is 725 (1 TO 1000). The rider rating in this model is 423 (1000 max.) and the motorcycle rating 624 (1000 max.). The parameters of the recorded data 1230 are miles 123, time 1232, speed 1233, elevation change measured in feet 1234, Lateral G-Force 1235 and the maximum positive acceleration 1236 as well as the maximum negative acceleration 1237, the latter two in feet per second. These data is collected every 2.5 seconds which equals 220 ft or rather 0.0417 miles at a speed of 60 mph. The time data and acceleration is collected every ten seconds which equals 600 measuring points per minute. This data is, according to the example, at the original time point at mile 28 a speed of 44.5 mph and an elevation of −150 ft. At mile 28.50000 the time elapsed is 1030.10, the speed is increased to 45.5 mph, the elevation change in feet is −152 ft., the Lateral G-Force is 2.56 N, a maximum positive acceleration of 82.4 ft/sec$^2$ and a maximum negative acceleration of 74.5 ft/sec$^2$. The next measurements are taken every 2.5 seconds. Additionally, the processor records GPS locations, gear shifts and miles per gear shifts.

Figure 13:
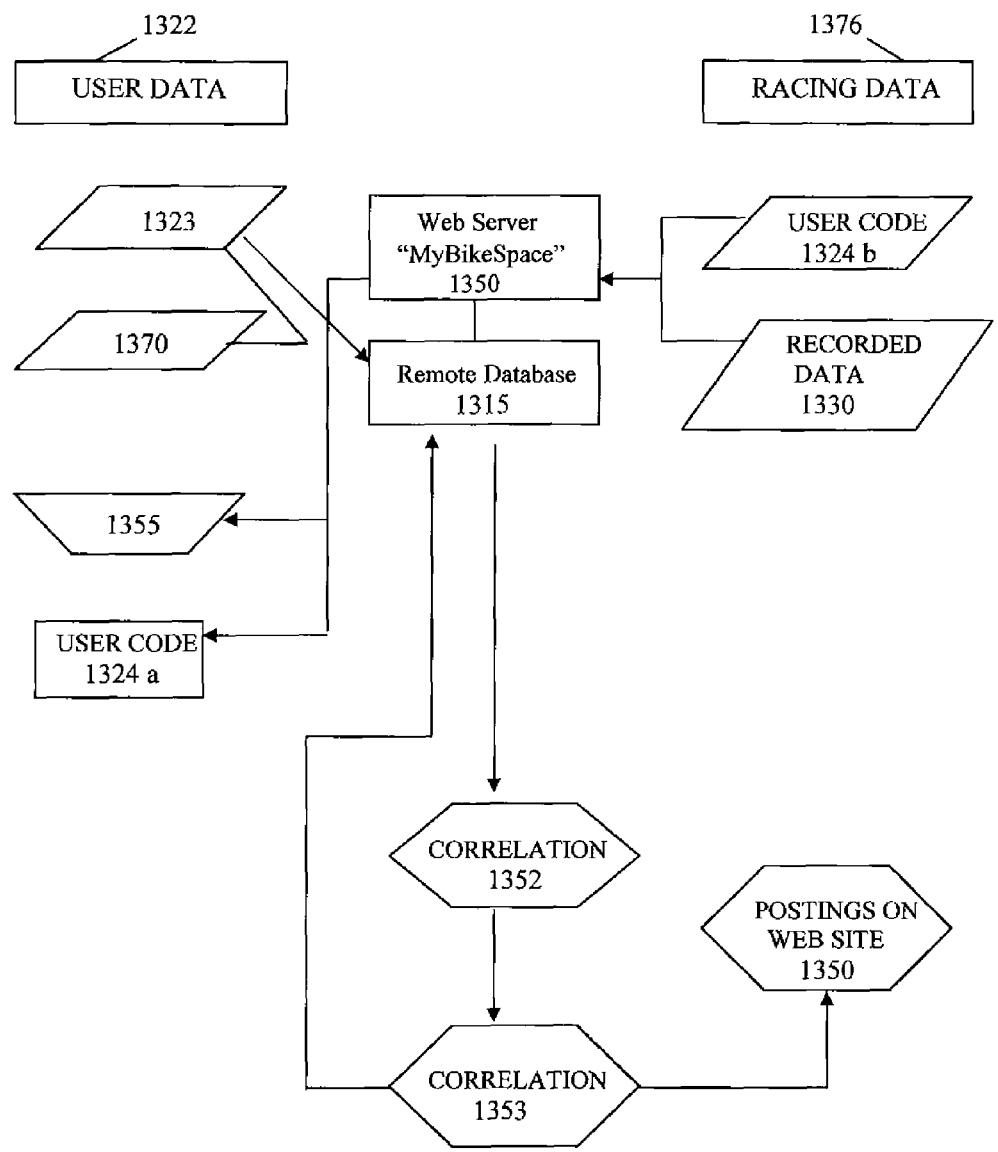
FIG. 13 is a flowchart of various data input and data correlation.

FIG. 13 is a flowchart showing the Data Input for the game. The two main categories of data collected on the web server 1350 are the User Data 1322 and the Game Data 1376. Comprised user data 1322 is personal information about the rider 1323 and information about the motorcycle 1370. For a certain fee, charged from the user's credit card 1355, the user is assigned a certain user code 1324a. This user code 1324b also serves to identify and allocate the recorded data 1330. Recorded Data is in particular the data recorded and collected by the Inertial Navigation System and the data inserted by the user on the mobile unit. This data is transferred to the remote database and the web server 1350 which correlates 1352 the GPS Data with a global map. There from, the Accelerometer Data is correlated 1353 with GPS Velocity and Location Data, User Score and the Velocity Profile is compared to other user's scores and posted on the exemplarily called "MyBikeSpace" web server 1350 that is accessed by the user through the internet. Additionally, the user course, a video, the velocity, the track score and the rider score are posted on the user's "MyBikeSpace" web site 1350.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer implemented method including at least one non-transitory computer-usable readable storage medium having non-transitory computer readable program codes embodied therein for causing a computer system to perform a method of providing a virtual racing system comprising steps::
   providing by the computer system a first racing game set of rules using a mobile unit comprising a keypad, an I/O control, a processor, a memory, a transceiver, a GPS, and an Inertial Navigation;
   logging in through an interface located locally or through the internet, by the computer system, retrieving race information from a remote database;
   starting to record by the computer system a user's racing information by pressing the keypad activating the mobile unit;
   transmitting and receiving by the computer system using the transceiver, wherein the transceiver communicates with the remote database, of predetermined waypoint coordinates and corresponding target times for said predetermined waypoints;
   operating the user's vehicle enabled by the mobile unit and transiting a known course using information received by the transceiver on the user's mobile unit;
   collecting by the mobile unit from the user's movement information;
   applying the information by the computer system to the known course to calculate results of the user with the user's vehicle and the known course;
   continuously collecting racing information and transmitting by the computer system using the transceiver of this information from the user's mobile unit to the remote database in real time or after storing the information on the mobile unit's memory;
   continuously storing, processing and plotting the positions and said information by the computer system at said the remote database;
   measuring elapsed times and average speed between waypoints by the computer system;
   ending data collection, recording and transmitting of the user's racing information by the computer system using the mobile unit by pressing the keypad;

comparing the user's results with a plurality of users' results by the computer system using the remote database;

awarding cards to the plurality of users by the computer system, wherein the cards' ranking hierarchy corresponding to each user's racing time being in proximity to the target times for the predetermined way point coordinates of the course in racing games; and displaying the racing games' results by the computer system using the web server causing a different display associated with the user.

2. The method of claim 1, wherein the user movement information correlated at the remote database by the computer system includes basic input, average measurement data of the user and the vehicle and ratings of the user and the vehicle.

3. The method of claim 1 further comprising:
transmitting clues by the computer system using the transceiver wherein the transceiver communicates with the remote database, from the remote database to the vehicle's mobile unit.

4. The method of claim 1 further comprising:
transmitting various sets of information from the remote database by the computer system using the mobile unit and the transceiver, wherein the mobile unit is affixed to the vehicle and the transceiver communicates with the remote database, to the vehicle's mobile unit wherein the information correlates with an actual location, matching the various sets of information by correlating actual locations of the user by the computer system using the mobile unit.

5. The method of claim 1 further comprising:
associating one or more race points onto one or more geographical maps by the computer system using the web server.

6. The method of claim 1 further comprising:
transmitting and receiving specific waypoint coordinates and corresponding target times for the predetermined waypoints by the computer system using the transceiver, wherein the transceiver communicates with the remote database;

measuring an elapsed time and calculating average speed between waypoints at first waypoint and second waypoint, each having respective time stamps logged by the GPS system by the computer system;

providing an award to a user based on actual time associated with the user by the computer system using the web server;

storing two or more race times per race by the computer system; and comparing times associated with users by the computer system using the remote database according to Texas-Hold-Em rules.

7. The method of claim 1 further comprising following steps:
providing a second racing by the computer system;
logging in through an interface located locally or through the internet, by the computer system, retrieving race information from the remote database;
starting recording by the computer system of racing information by pressing the keypad activating the mobile unit;
transmitting a first clue by the computer system from the remote database to the vehicle's mobile unit,
operating the vehicle enabled by the mobile unit to coordinates of the first clue received by the computer system;

unraveling clue by clue by the computer system and racing to the coordinates of a den of the next clue in order to complete a progressively received mapped course;

continuously collecting the racing information and transmitting this information by the computer system using the transceiver from the mobile unit to the remote database in real time or after storing the information on the mobile unit's memory;

continuously storing, processing and plotting the position and the information by the computer system at the remote database;

ending the plotting and the recording and transmitting of the racing information by the computer system by pressing the keypad;

comparing results between different users at different times by the remote database by the computer system; and displaying the racing games' results by the computer system using the web server causing a different display associated with the user.

8. The method of claim 1 further comprising following steps:
providing a third racing game set of rules by the computer system;
logging in through an interface located locally or through the internet, by the computer system, retrieving race information from the remote database;
starting recording by the computer system of racing information by pressing the keypad activating the mobile unit;
transmitting various sets of information by the computer system from the remote database to the vehicle's mobile unit wherein the information correlates with an actual location;
matching the various sets of information by the computer system with the correlating actual locations of the user;
operating the vehicle enabled by the mobile unit to coordinates of the actual locations;
continuously collecting the racing information and transmitting this information by the computer system using the transceiver from the mobile unit to the remote database in real time or after storing the information on the mobile unit's memory;
continuously storing, processing and plotting the position and the information by the computer system at the remote database;
ending the plotting, recording and transmitting by the computer system of the racing information using the mobile unit by pressing the keypad;
comparing results between different users at different times by the remote database; and
displaying the racing games' results by the computer system using the web server causing a different display associated with the user.

9. The method of claim 1 further comprising following steps:
providing a fourth racing game set of rules by the computer system;
logging in through an interface located locally or through the internet retrieving race information from the remote database;
overlaying race points by the computer system onto a map;
starting recording of racing information by pressing the keypad activating the mobile unit;
calculating race parameters by the computer system;

operating the vehicle enabled by the mobile unit and transiting a course using the racing information received on the user's mobile unit;

continuously collecting the racing information and transmitting this information by the computer system from the mobile unit to the remote database in real time or after storing the information on the mobile unit's memory;

continuously storing, processing and plotting the position and the information by the computer system at the remote database;

continuously plotting the position of the various users on the map by the computer system at the remote database;

ending the plotting and the recording and transmitting of the information by the computer system using the mobile unit by pressing the keypad;

comparing racing games' results between different users at different times by the remote database; and displaying the racing games' results by the computer system using the web server causing a different display associated with the user.

10. The method of claim 1 for providing a fifth racing game set of rules further comprising the following steps:

providing a fifth racing game set of rules by the computer system;

logging in through an interface located locally or through the internet retrieving race information from the remote database;

starting recording of racing information by pressing the keypad activating the mobile unit;

transmitting and receiving, by the computer system wherein the computer system interfaces with the remote database, specific waypoint coordinates and corresponding target times for the predetermined waypoints;

operating the vehicle enabled by the mobile unit and transiting a course using the racing information received on the user's mobile unit;

continuously collecting the racing information and by the system this information from the mobile unit to the remote database in real time or after storing the information on the mobile unit's memory;

continuously storing, processing and plotting the position and the information by the computer system at said remote database;

measuring elapsed times and average speed between waypoints lodged via GPS and time stamps by the computer system;

awarding cards to users by the computer system using the web server, wherein the cards' ranking in the hierarchy corresponds with the user's racing times' proximity to the racing game's target times;

retaining two of a maximum obtainable five cars per race by the computer system;

ending data collection, recording and transmitting of the racing information by the computer system using the mobile unit by pressing the keypad;

comparing results and the card combinations of different users by the remote database according to Texas-Hold-Em rules; and displaying the racing games' results by the computer system using the web server causing a different display associated with the user.

11. The method of claim 1 further providing a sixth racing game set of rules by the computer system in units with other users, wherein the group members' scores obtained for any GPS Racing Game accumulate and are ranked.

* * * * *